Patented Oct. 24, 1922.

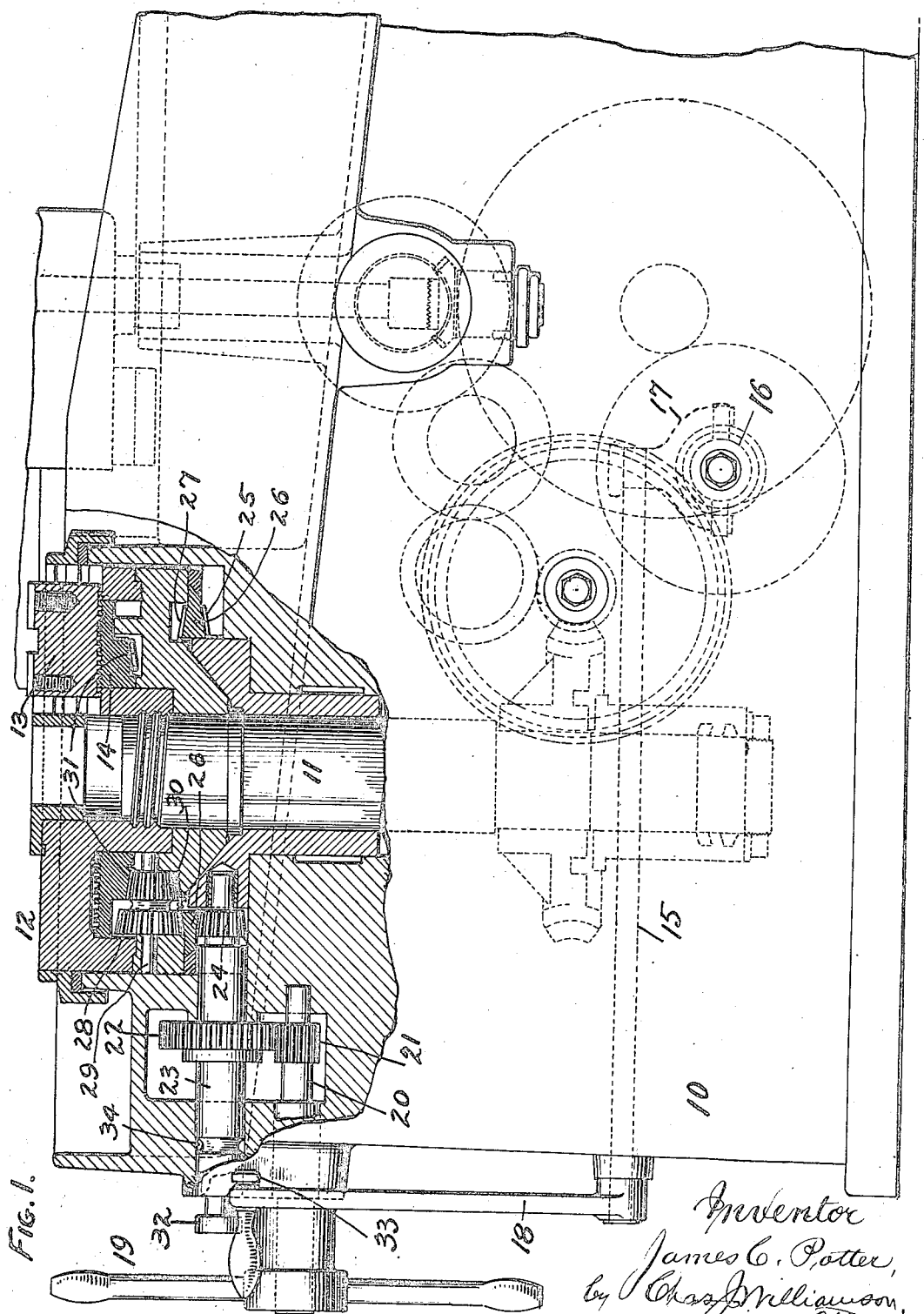

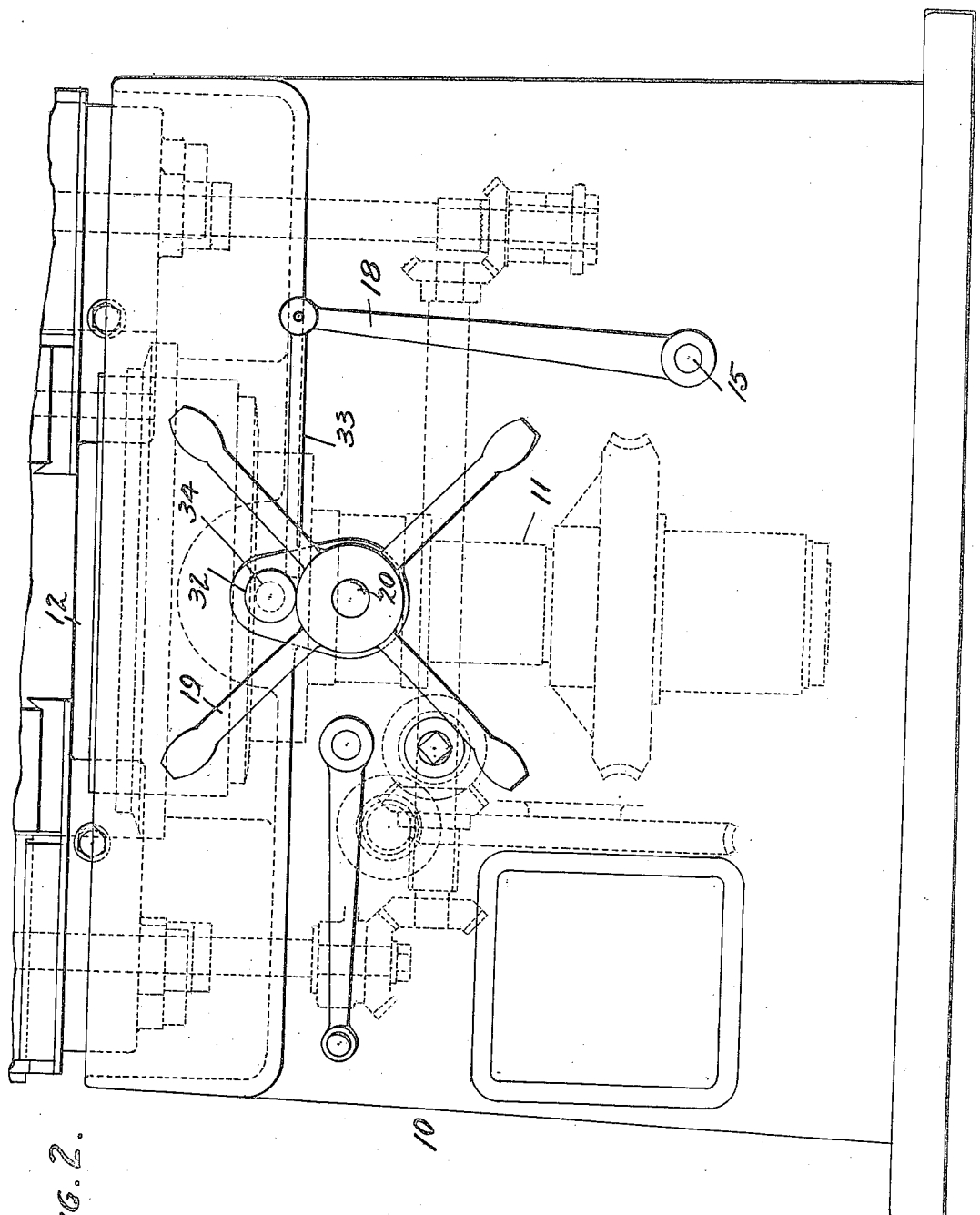

1,433,032

UNITED STATES PATENT OFFICE.

JAMES C. POTTER, OF PAWTUCKET, RHODE ISLAND.

CHUCK FOR METAL-WORKING MACHINES.

Application filed October 2, 1919. Serial No. 327,871.

*To all whom it may concern:*

Be it known that I, JAMES C. POTTER, a citizen of the United States, and a resident of Pawtucket, Rhode Island, have invented certain new and useful Improvements in Chucks for Metal-Working Machines, and do hereby declare that the following is a full, clear, and exact description thereof.

My invention relates to chucks, and particularly to means for opening and closing the same.

In chucks, such for example, as those of vertical turret lathes, as heretofore constructed the chuck jaws are moved to clamp or release work by a removable hand wrench and it is necessary to stop the chuck at a certain point for the application of the wrench thereto. All this means inconvenience to the workman, and loss of time. The object of my invention is to avoid these objections, and also to render the operation of closing and opening the chuck easier for the workman and free from danger of injury. To illustrate my invention I show it embodied in a vertical turret lathe, but it is to be understood that I do not confine myself only to that application or embodiment of my invention.

In the annexed drawings:—

Fig. 1 is a side elevation of enough of a vertical turret lathe with parts in section, to illustrate my invention;

Fig. 2 is a front elevation thereof.

Referring to the drawings, 10 designates the stationary framework of a vertical turret lathe, 11 the spindle in a vertical position, of course, 12 the chuck with radial jaws 13 that are moved by a scroll 14; the drawing not showing the vertically reciprocating turret slide. Power to revolve the spindle and chuck as well as to impart the proper movements to other members of the lathe, is taken from a suitably driven horizontal shaft 16, the operative connection with such shaft including trains of gearing not necessary to be described, and a clutch on said shaft by which the power connection therewith is controlled. The clutch, as shown, is actuated by a yoke 17 on a horizontal rock shaft 15 which, at the front of the lathe has an upstanding lever handle 18 by which the shaft may be rocked to shift the clutch, all in a well-known manner.

To rotate the scroll 14 for chucking and unchucking, I provide a hand wheel 19 at the front of the lathe which is fixed to one end of a horizontal shaft 20 journalled in proper bearings in the frame, or base 10, and which, within the latter, has a pinion 21 that meshes with a gear 22 on a parallel shaft 23. On the latter is cut or fixed a bevel pinion 24 which meshes with a bevel gear 25 on the under side of a ring or annulus 26 mounted for rotation on the underside of the body of the chuck 12, concentric with the latter so as to rotate therewith as well as be rotatable independently thereof, and upon the upper side of said ring 26 is a bevel gear 27 with which meshes a bevel pinion 28 on a short horizontal shaft 29, and integral with, or attached to the pinion 28 is a second bevel pinion 30 in mesh with a bevel gear 31 cut on, or attached to, the underside of the scroll 14.

The operative connection between the hand wheel and the scroll, must exist only at the time the chuck is not rotating, otherwise the rotation of the chuck would be accompanied by revolution of the hand wheel, with danger of injury to the workman. I provide for this by making the shaft 23 longitudinally movable so as thereby to shift its pinion 24 in or out of mesh with the gear ring 26, but at all times maintaining the gear connection between the shaft 23 and the hand wheel shaft 20, and for conveniently moving the shaft 23 longitudinally, its end is protruded outside the base 10 and formed into a head or knob 32, which may be readily grasped by the hand. I make it impossible to operatively connect the hand wheel and the scroll unless the chuck is operatively disconnected from the drive shaft and thus safeguard the workman from danger of harm which would exist if the operative connection could be made between hand wheel and scroll while drive shaft and chuck are power-connected. I accomplish this important result by interlocking the clutch operating mechanism and the shaft 23. This can be very simply, and yet most efficiently done, as shown in the drawings, by attaching to the clutch operating hand lever 18 a rod 33 and providing the shaft 23 with an annular groove 34 which alines with the free end of said rod 33, only when the shaft 23 has been moved to a position that unmeshes its pinion 24 with the gear ring 26 and until rod end and groove 34 thus aline, the hand lever 18 cannot be moved to clutch the chuck revolving gearing with the power shaft 16, for the contact of the free end of the rod 33 and the shaft 23 adjacent said groove 34 will prevent.

An important feature of my invention resides in the fact that no matter at what point in its revolution the chuck 12 may come to rest, instantly the scroll-operating pinion 24 may be moved into mesh with the gear ring, 26 and thus no time is lost as is the case when the chuck must be in a certain position for application of the jaw-moving means.

It will be perceived that by the operative connections I provide between the scroll and the hand wheel at the front of the machine as a permanent part of the organization, the operations of chucking and unchucking can be performed expeditiously, and easily, and thus time and effort conserved, and without risk or danger of injury to the workman.

I claim:—

1. The combination of a chuck, chuck-revolving means including a clutch device, chuck-closing and opening means including intermeshing gears, means for meshing and unmeshing said gears comprising a longitudinally slidable element, means for operating said clutch device, and interlocking means between said slidable element and said clutch-operating means that permit the movement of the clutch device into action when said gears are unmeshed, and prevent its movement into action when said gears are in mesh.

2. The combination of a chuck, its support, a gear operatively connected with the chuck to open and close the same, a slidable shaft mounted in said support having a pinion in mesh with said gear when the shaft is in one of its positions, a hand-rotatable shaft parallel with said slidable shaft, a constantly meshing gear connection between the two shafts, chuck-revolving means, including a clutch device, and a member connected with the clutch device whose movement is obstructed when the slidable shaft is in one position and is unobstructed when said shaft is in another position.

3. The combination of a chuck, its support, and chuck-closing and opening means including a hand-operated member, a slidable shaft geared to said member, and a gear connection, one element of which is carried by said slidable shaft, chuck revolving means including a clutch device, a hand operated device to control the latter, and an interlocking connection between said device and said member that prevents revolution of the chuck when said member is in operative connection therewith which includes a groove in said shaft and a rod operatively connected with the clutch device.

In testimony that I claim the foregoing I have hereunto set my hand.

JAMES C. POTTER.